(No Model.)

E. REYNOLDS.
POTATO DIGGER.

No. 564,256.            Patented July 21, 1896.

Witnesses
Arthur Ashley
T. L. Mockator

Inventor
Elias Reynolds
by L. L. Daniel Son
his Attorneys

UNITED STATES PATENT OFFICE.

ELIAS REYNOLDS, OF FRANKLINVILLE, NEW YORK.

POTATO-DIGGER.

SPECIFICATION forming part of Letters Patent No. 564,256, dated July 21, 1896.

Application filed April 23, 1895. Serial No. 546,901. (No model.)

*To all whom it may concern:*

Be it known that I, ELIAS REYNOLDS, a citizen of the United States, residing at Franklinville, in the county of Cattaraugus and State of New York, have invented certain new and useful Improvements in Potato-Diggers; and I do hereby declare the following to be a full, clear, and exact description of the invention, such as will enable others skilled in the art to which it appertains to make and use the same.

My invention relates to potato-diggers which comprise a wheeled truck adapted to be moved across a field with the wheels straddling the potato-hills and provided with a scoop or shovel which engages with the earth of the hills and carries it and the potatoes to the rear onto a series of fingers or bars.

The object of the present invention is to provide an improved machine of the above description which shall possess superior advantages with respect to efficiency in operation, and also to provide improved means for vibrating the fingers for separating the earth from the potatoes.

The invention consists in the novel construction and combination of parts hereinafter fully described and claimed.

Figure 1:
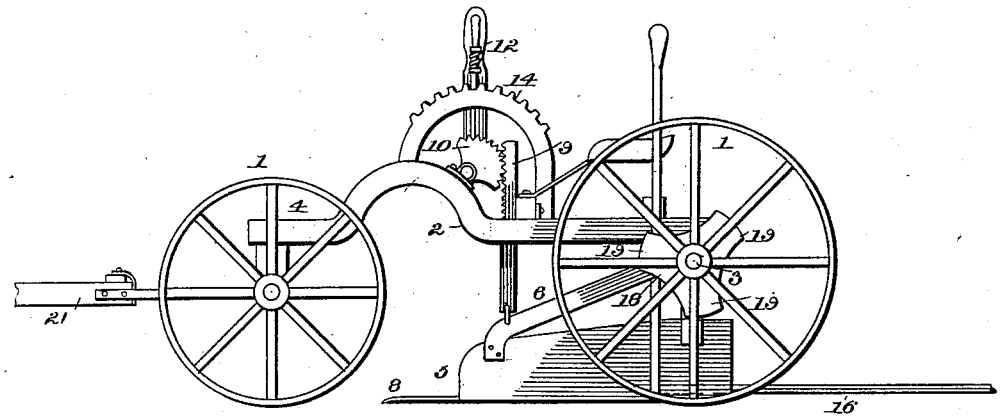
Figure 2:
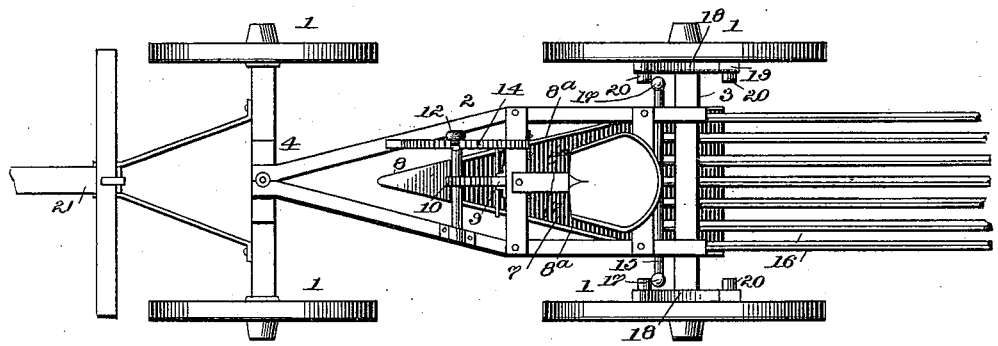
Figure 3:
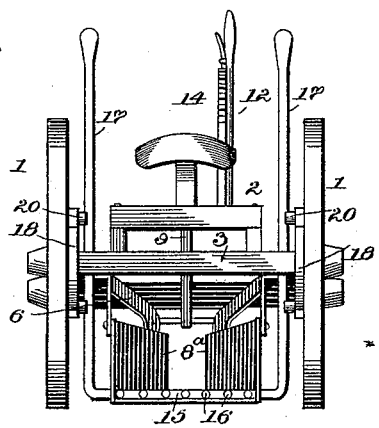

In the accompanying drawings, Figure 1 is a side elevation of a potato-digging machine constructed in accordance with my invention. Fig. 2 is a plan view of the same. Fig. 3 is a rear view.

In the said drawings the reference-numeral 1 designates the wheels of the truck, and 2 the frame thereof, consisting of two bars, the rear ends of which are connected with the rear axle 3, while the front ends converge and are pivotally connected with a bolster 4, secured to the front axle.

The numeral 5 designates a scoop or shovel comprising the side bars 6, pivotally connected with the rear axle, the bottom 7, provided with a triangular point 8, and the sides 8ᵃ, secured to said bars. To the front ends of the bars 6 is pivotally connected a vertical rack-bar 9, with which engages a rack-segment 10 of a lever 12, pivoted to the truck-frame. This lever is provided with a spring-actuated pawl 13, which is adapted to engage with a notched segment 14.

Journaled to the sides of the scoop or shovel is a transverse rod 15, to which are secured a number of rearwardly-extending fingers 16, and said rod is formed or provided with vertical arms 17. Secured to the rear axle near each end is a hub 18, provided with a series of radial arms 19, having inwardly-extending pins or studs 20, which are adapted to strike the arms 17 as the axle rotates and vibrate the fingers.

As will be seen, the vertical arms 17 extend up above the driver's seat at each side, and their upper ends are provided with handles within easy reach of the driver, so that the fingers 16 may be vibrated or operated by hand should the fingers become clogged, which is frequently the case.

The numeral 21 designates the tongue.

The operation will be readily understood. The truck is drawn across the field with the wheels straddling the potato hills or rows. During its movement the pointed end of the scoop will take into the hills or rows, causing the earth and potatoes to be forced back onto the bottom of the scoop and from thence onto the fingers. At the same time the fingers will be vibrated by the radial arms and pins and the vertical arms and rod, causing the earth to be separated from the potatoes and fall down between the fingers, while the potatoes, freed from the earth, will be deposited on the ground at the rear of the fingers.

By means of the rack-bar and segment-lever the scoop can be elevated so as to hold it up above the ground when the machine is not in use and be held in such position by the pawl and notched segment.

Having thus fully described my invention, what I claim is—

In a potato-digger, the combination with the frame, the rear axle, the driver's seat secured to said frame, the scoop having converging sides, the converging side bars 6 pivotally connected with said axle, the vertical rack-bar 9, pivotally connected with said bars 6, the rack-segment 10 engaging therewith and the lever 12, of the transverse rod or shaft 15, journaled to the sides of the scoop, the rearwardly-extending fingers 16 secured thereto, the vertical arms 17, secured to said shaft and extending up above the driver's seat and provided with handles at the upper ends, and the hubs 18 fixed to said axle, provided with a series of radial arms 19, having inwardly-extending pins 20 which engage with said vertical arms, substantially as described.

In testimony whereof I affix my signature in presence of two witnesses.

ELIAS REYNOLDS.

Witnesses:
JOHN W. KALES,
JAMES McSTAY.